US012804737B2

(12) United States Patent
Fukushima et al.

(10) Patent No.: US 12,804,737 B2
(45) Date of Patent: Nov. 17, 2026

(54) RADIO COMMUNICATION METHOD, RADIO BASE STATION, AND RADIO COMMUNICATION SYSTEM

(71) Applicant: NTT, Inc., Tokyo (JP)

(72) Inventors: Takeru Fukushima, Tokyo (JP); Motoharu Sasaki, Tokyo (JP); Toshiro Nakahira, Tokyo (JP); Takatsune Moriyama, Tokyo (JP); Yasushi Takatori, Tokyo (JP)

(73) Assignee: NTT, Inc., Tokyo (JP)

( * ) Notice: Subject to any disclaimer, the term of this patent is extended or adjusted under 35 U.S.C. 154(b) by 365 days.

(21) Appl. No.: 18/697,879

(22) PCT Filed: Nov. 15, 2021

(86) PCT No.: PCT/JP2021/041967

§ 371 (c)(1),
(2) Date: Apr. 2, 2024

(87) PCT Pub. No.: WO2023/084788

PCT Pub. Date: May 19, 2023

(65) Prior Publication Data

US 2025/0008576 A1 Jan. 2, 2025

(51) Int. Cl.
*H04W 4/00* (2018.01)
*H04W 76/10* (2018.01)
*H04W 76/20* (2018.01)
*H04W 76/40* (2018.01)

(52) U.S. Cl.
CPC .......... *H04W 76/10* (2018.02); *H04W 76/20* (2018.02); *H04W 76/40* (2018.02)

(58) Field of Classification Search
CPC ..... H04W 76/10; H04W 76/20; H04W 76/40; H04W 48/06; H04W 48/10
USPC .................................................. 370/329, 330
See application file for complete search history.

(56) References Cited

U.S. PATENT DOCUMENTS 12,465,292 B2 * 11/2025 Poltorak .............. A61B 5/0024
2021/0036863 A1 * 2/2021 Su ......................... H04L 9/3239
2021/0392576 A1 * 12/2021 Ergen ...................... H04W 8/18
2022/0022159 A1 * 1/2022 Johansson ............. H04W 60/04
2022/0164333 A1 * 5/2022 Kim ......................... G05B 9/02
2022/0407770 A1 * 12/2022 Fujimoto ................ H04L 41/00
2024/0031189 A1 * 1/2024 Kimura ............... H04L 12/1886

OTHER PUBLICATIONS

X. Ling, et al., "Blockchain Radio Access Network (B-RAN): Towards Decentralized Secure Radio Access Paradigm", IEEE Access, vol. 7, Date of publication Jan. 1, 2019, p. 9714-9723.

* cited by examiner

*Primary Examiner* — Chuong T Ho
(74) *Attorney, Agent, or Firm* — IPUSA, PLLC

(57) ABSTRACT

A radio communication method includes: a transmitting step of broadcasting, by a radio base station, a connection condition of the radio base station; a managing step of managing, by the radio base station, a connection with a radio station requesting a connection to the radio base station based on the connection condition, by using a blockchain shared by a plurality of radio base stations; and a changing step of acquiring, by the radio base station, information on a radio station connected to another radio base station from the blockchain and changing the connection condition of the radio base station based on the information on the radio station connected to the other radio base station.

7 Claims, 11 Drawing Sheets

100

RADIO COMMUNICATION METHOD, RADIO BASE STATION, AND RADIO COMMUNICATION SYSTEM

TECHNICAL FIELD

The present invention relates to a radio communication method, a radio base station, and a radio communication system.

BACKGROUND ART

A radio communication system that performs distributed processing on connection control using a blockchain technology in connection control between a radio base station and a radio station is known (see, for example, NPL 1).

CITATION LIST

Non Patent Literature

NPL 1: X. Ling, et al., "Blockchain Radio Access Network (B-RAN): Towards Decentralized Secure Radio Access Paradigm", IEEE Access, Volume: 7, 2019, p. 9714 9723

SUMMARY OF INVENTION

Technical Problem

In the related art, since a radio station (user terminal) autonomously determines a radio base station that is a connection destination, there is a bias towards radio stations connecting to a specific radio base station (for example, a radio base station with a low connection cost), and the utilization efficiency of radio resources in the entire radio communication system is thus degraded.

Embodiments of the present invention have been made in view of the above problems, and improve the use efficiency of radio resources of an entire radio communication system in the radio communication system in which a radio station determines a radio base station that is a connection destination.

Solution to Problem

In order to solve the above problems, a radio communication method according to an embodiment of the present invention includes a transmitting step of broadcasting, by a radio base station, a connection condition of the radio base station; a managing step of managing, by the radio base station, a connection with a radio station requesting a connection to the radio base station based on the connection condition, by using a blockchain shared by a plurality of radio base stations; and a changing step of acquiring, by the radio base station, information on a radio station connected to another radio base station from the blockchain and changing the connection condition of the radio base station based on the information on the radio station connected to the other radio base station.

Advantageous Effects of Invention

According to the embodiments of the present invention, it is possible to improve the use efficiency of radio resources of an entire radio communication system in the radio communication system in which a radio station determines a radio base station that is a connection destination.

DESCRIPTION OF EMBODIMENTS

Hereinafter, an embodiment of the present invention (the present embodiment) will be described below with reference to the drawings. The embodiment described hereinafter is merely an example, and an embodiment to which the present invention is applied is not limited to the following embodiment.

<Overview>

First, an overview of a radio communication system using a blockchain, which is a premise of the present embodiment, will be described. The radio communication system is a system capable of connecting a radio station (a user terminal) to a radio base station without centralized control by distributively performing connection processing using a blockchain technology when performing the connection processing between the radio base station and the radio station.

(Overview of Processing)

Figure 10:
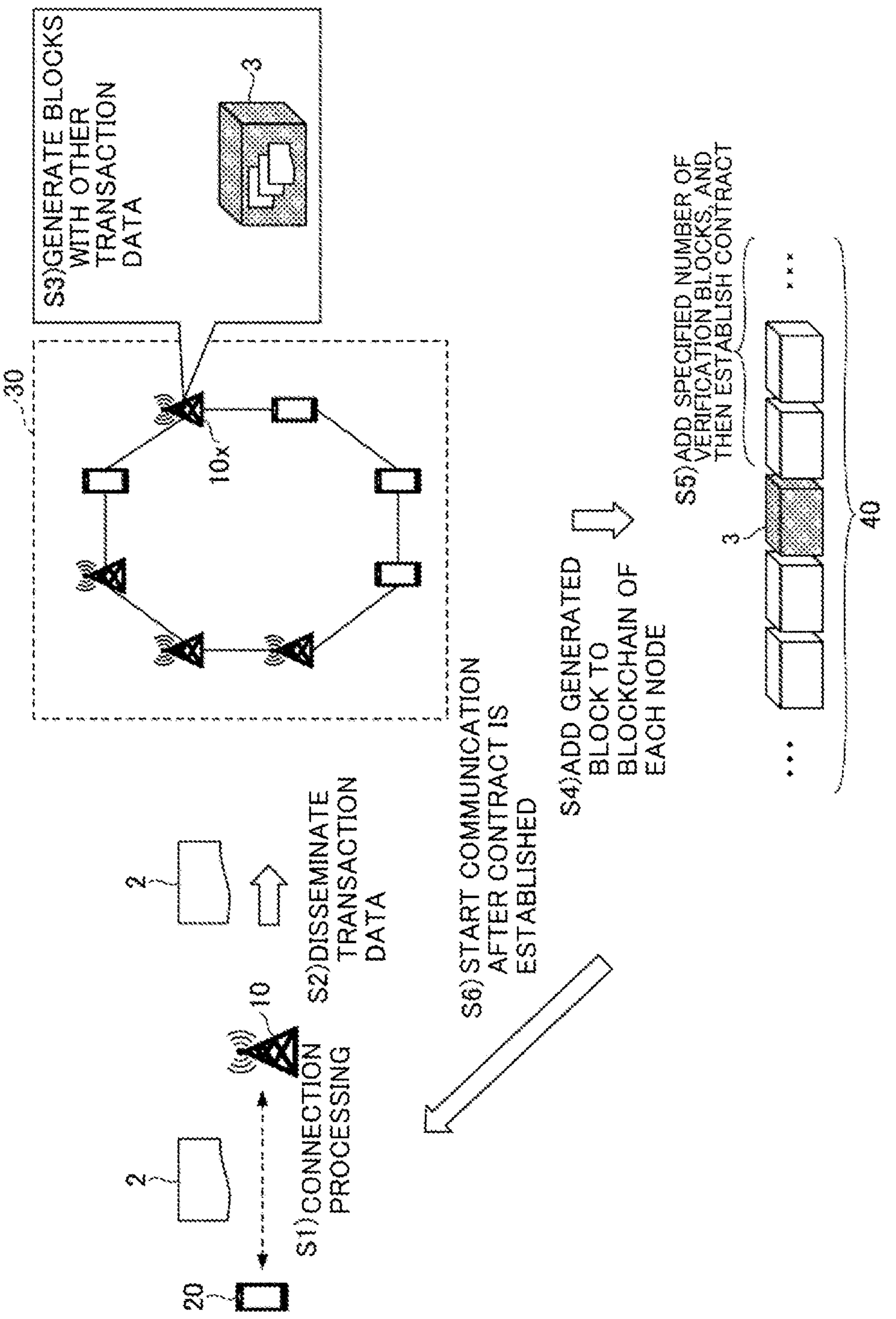
FIG. 10 is a diagram illustrating an overview of processing of a radio communication system using a blockchain.

FIG. 10 is a diagram illustrating an overview of processing of a radio communication system using a blockchain. In the radio communication system, transaction data 2 is created between a radio base station 10 and a radio station 20 in connection processing for connecting the radio station 20 to the radio base station 10 (step S1). For example, the radio station 20 receives connection conditions broadcast by the radio base station 10 and confirms the communication quality of a wireless communication network provided by the radio base station 10, a connection cost, and the like. On the other hand, the radio base station 10 confirms whether the radio station 20 has sufficient payment ability. Further, when an agreement on the connection conditions is obtained between the radio base station 10 and the radio station 20, the radio base station 10 records content of the agreement in the transaction data 2.

The communication quality of the wireless communication network provided by the radio base station 10 includes, for example, a throughput or a total data amount. The radio station 20 may agree to the connection conditions when the communication quality provided by the radio base station 10 satisfies all communication quality required by the radio station 20. Alternatively, the radio station 20 may agree to the connection conditions when the communication quality provided by the radio base station 10 partially satisfies the communication quality required by the radio station 20.

The radio base station 10 disseminates the transaction data 2 created in the connection processing to nodes participating in a blockchain network 30 (step S2). The blockchain network 30 includes a plurality of nodes that collectively record the transaction data 2 in units of blocks and share a blockchain (distributed ledger) on which a plurality of blocks have been recorded in time series. The plurality of nodes includes a plurality of radio base stations 10 constituting the radio communication system. The plurality of nodes may include nodes (computers, radio stations, or the like) other than the radio base stations 10.

When the blockchain network 30 is notified of the transaction data 2, some nodes participating in the blockchain network 30 (for example, a radio base station 10*x*) generate block 3 together with other transaction data (step S3). Further, after the block 3 is generated, the blockchain network 30 adds the generated block 3 to a blockchain 40 included in each node included in the blockchain network 30 (step S4).

The blockchain 40 of each node reserves the added block, and a predetermined number of blocks (verification blocks) are further added to the blockchain, and then, the reserved block is accepted so that the contract is established (step S5). After the contract is concluded, the radio base station 10 starts communication with the radio station 20 (step S6).

The above processing allows the radio communication system to execute the connection processing between the radio base station 10 and the radio station 20 through distributed control without using a control station or the like that centrally controls the radio communication system.

(Problems)

In the above-described radio communication system, the radio station (user terminal) 20 mainly performs a control procedure for confirming the connection conditions transmitted by one or more radio base stations 10 and determining a radio base station 10 to which the radio station 20 requests the connection.

However, in a control procedure mainly performed by the radio station 20, radio stations 20 may be connected to a specific radio base station 10 in a concentrated manner, and the use efficiency of radio resources of the entire radio communication system may decrease.

Figure 11:
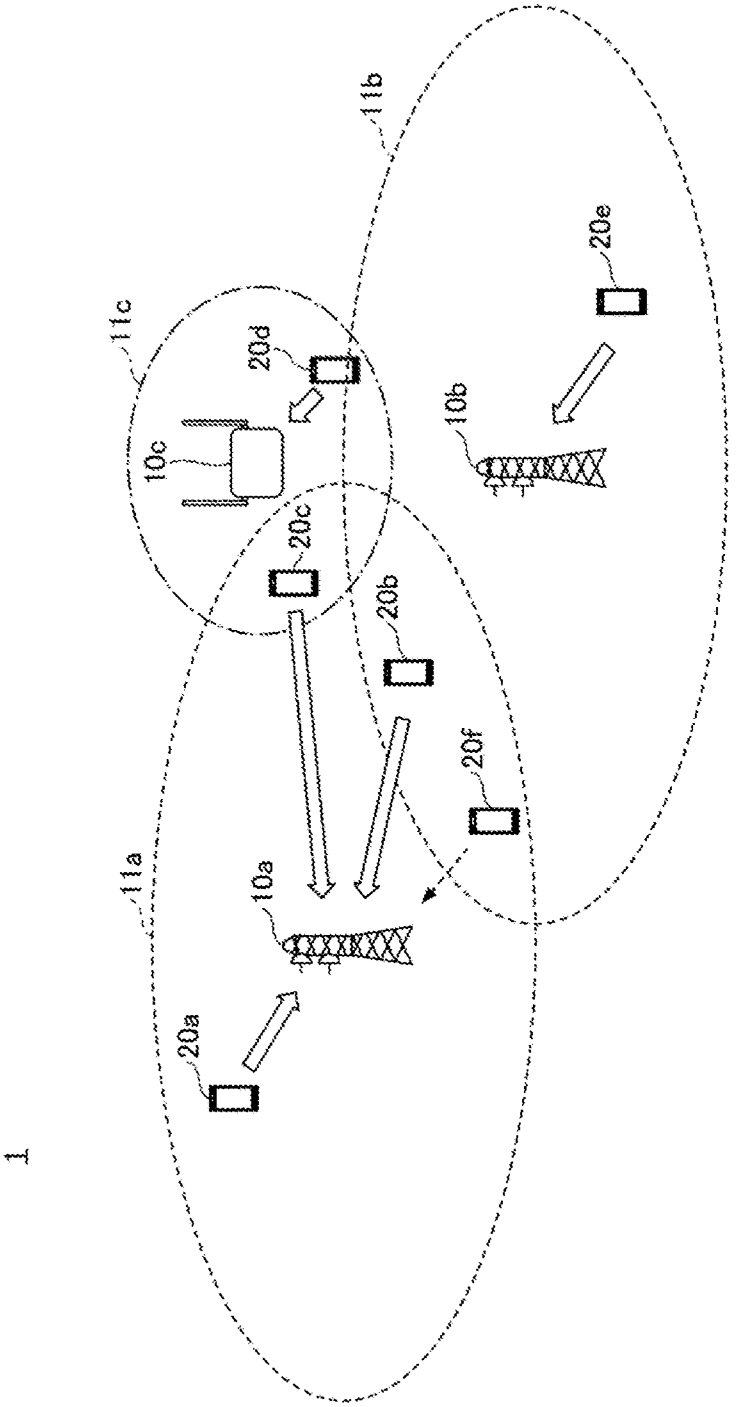
FIG. 11 is a diagram illustrating problems of a radio communication system using a blockchain.

FIG. 11 is a diagram illustrating a problem of a radio communication system using a blockchain. In the example of FIG. 11, a radio communication system 1 includes a plurality of radio base stations 10*a*, 10*b*, and 10*c* as an example for description. The radio base stations may (or may not) include the indoor radio base station 10*c*.

In FIG. 11, it is assumed that the radio base station 10*a* forms a network cell 11*a* and is capable of communicating with radio stations 20*a*, 20*b*, 20*c*, and 20*f* within the network cell 11*a*. It is assumed that the radio base station 10*b* forms a network cell 11*b* and can communicate with the radio station 20*b* and a radio station 20*e* within the network cell 11*b*. It is assumed that the radio base station 10*c* forms a network cell 11*c* and is capable of communicating with the radio station 20*c* and a radio station 20*d* within the network cell 11*c*.

In this state, when each radio station 20 autonomously determines a radio base station 10 that is a connection destination, for example, as illustrated in FIG. 11, the radio stations 20*a*, 20*b*, and 20*c* that perform a connection may be concentrated on a specific radio base station 10*a*. Further, for example, if the radio station 20*f* connects to the more nearby radio base station 10*a* when the radio station 20*f* starts new communication, there is concern that the use efficiency of the radio resources of the entire radio communication system 1 will further decrease.

Therefore, in the present embodiment, a radio communication method, a radio base station, and a radio communication system that improve the use efficiency of radio resources of an entire radio communication system in the radio communication system in which a radio station determines a radio base station that is a connection destination will be described.

<System Configuration>

Figure 1:
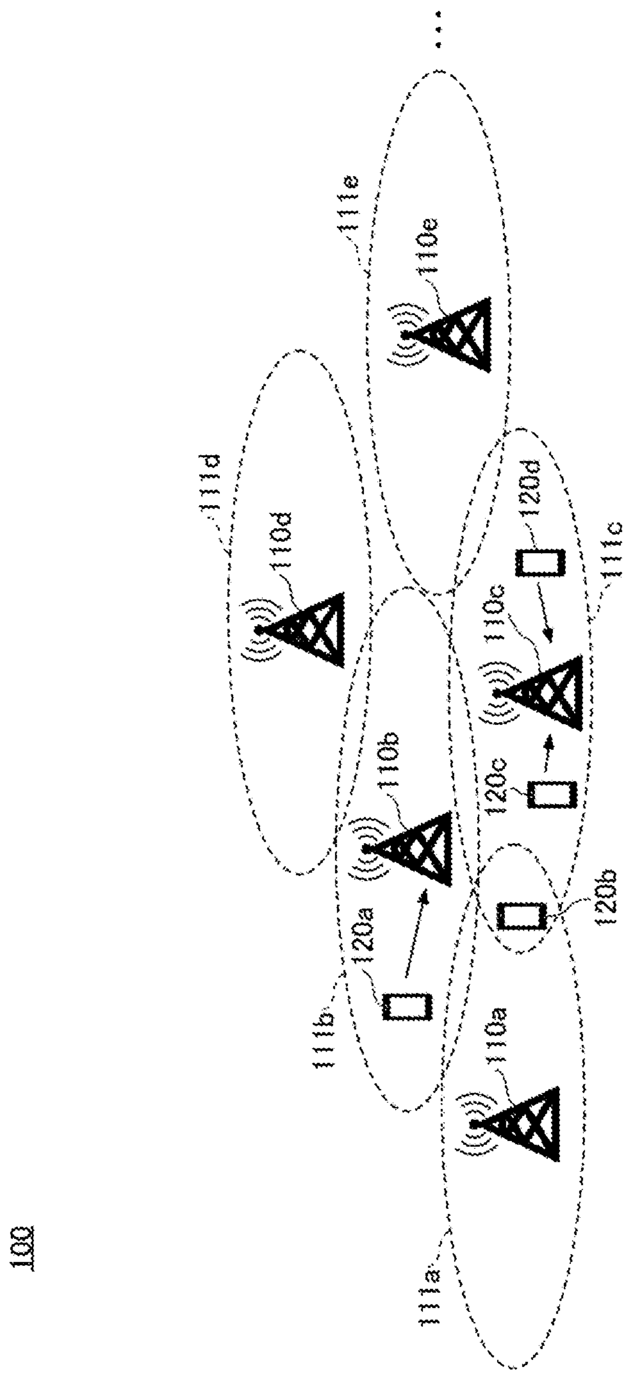
FIG. 1 is a diagram illustrating an example of a system configuration of a radio communication system according to the present embodiment.

FIG. 1 is a diagram illustrating an example of a system configuration of a radio communication system according to the present embodiment. As illustrated in FIG. 1, a radio communication system 100 includes a plurality of radio base stations 110*a*, 110*b*, 110*c*, 110*d*, 110*e*, . . . that form network cells different from each other. For example, the radio base station 110*a* forms a network cell 111*a* and can communicate with a radio station 120*b* within the network cell 111*a*. Further, the radio base station 110*b* forms a network cell 111*b*, and can communicate with a radio station 120*a* within the network cell 111*b*. Similarly, the radio base station 110*c* forms a network cell 111*c* and can communicate with the radio station 120*b*, a radio station 120*c*, and a radio station 120*d* within the network cell 111*c*. Further, the radio base station 110*d* forms a network cell 111*d*, and the radio base station 110*e* forms a network cell 111*e*.

In the following description, a "radio base station 110" is used to indicate an arbitrary radio base station among the plurality of radio base stations 110*a*, 110*b*, 110*c*, 110*d*, 110*e*, . . . . Similarly, a "radio station 120" is used to indicate an arbitrary radio station among the radio stations 120*a*, 120*b*, 120*c*, and 120*d*. Further, the number of radio base stations 110 and the number of radio stations 120 illustrated in FIG. 1 are examples, and there may be any number of radio base stations 110 and any number of radio stations 120.

Figure 2:
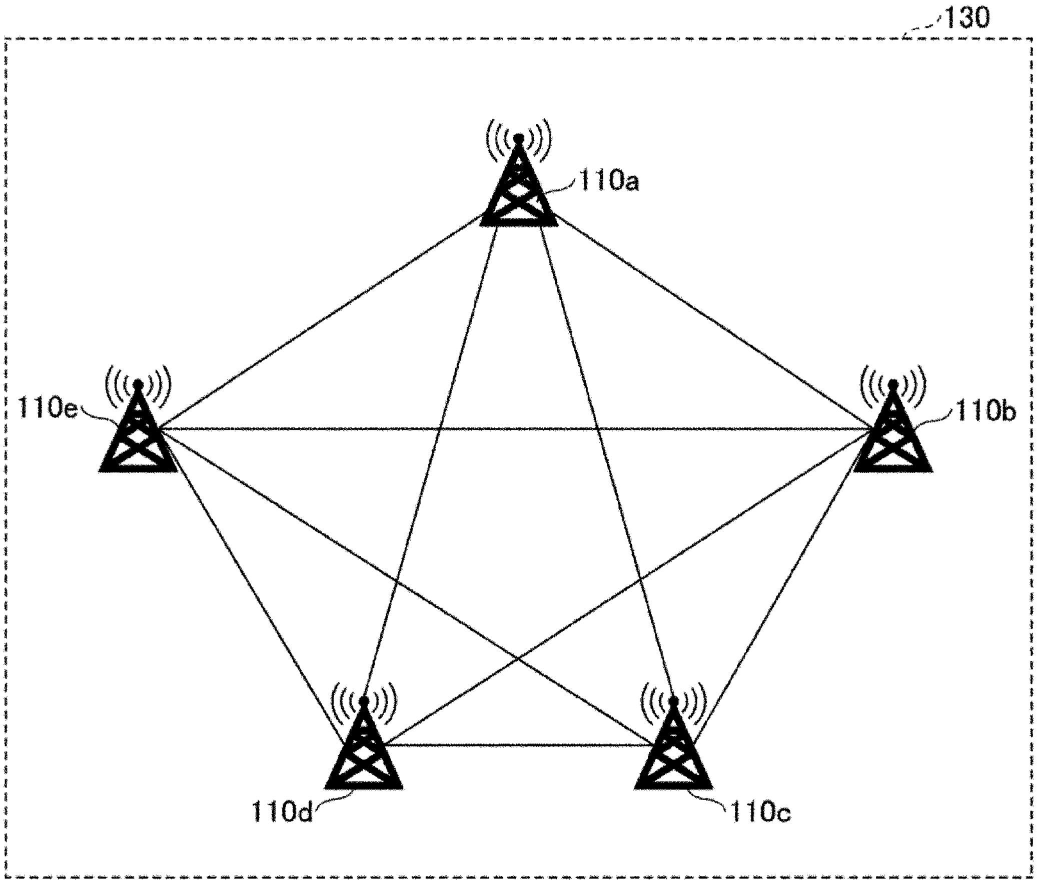
FIG. 2 is a diagram illustrating an example of a blockchain network according to the present embodiment.

Further, the plurality of radio base stations 110 function as nodes participating in a blockchain network 130, as illustrated in FIG. 2, for example, and the plurality of radio base stations 110 share the same blockchain. Here, the blockchain network 130 is a peer-to-peer (P2P) network (distributed network) in which each node can transmit and receive data equally with other nodes without going through a server or the like. The blockchain is a distributed ledger in which a plurality of nodes participating in a peer-to-peer network record transactions between two parties in a verifiable and permanent manner. The blockchain network 30 may include nodes (for example, other computers or radio stations) other than the radio base stations 110.

Each of the radio base stations 110 manages a connection with a radio station (user terminal) 120 by using the blockchain. For example, each of the radio base stations 110 records and manages the transaction data 2 or the like described with reference to FIG. 10 in the blockchain shared by the plurality of radio base stations 110. Accordingly, each of the radio base stations 110 can refer to the blockchain to acquire information on the other radio base stations 110 (for example, the number of radio stations 120 connected to the other radio base stations 110).

(Overview of Processing)

Here, referring back to FIG. 1, an overview of processing of the radio communication system 100 according to the present embodiment will be described.

Each of the radio base stations 110 broadcasts connection conditions, for connecting to each of the radio base stations, to radio stations 120 located within the network cell 111 of each of the radio base stations 110. The connection conditions include, for example, information such as communication quality to be provided and a connection cost (connection fee) for connection to each of the radio base stations 110.

A radio station 120 that starts communication receives the connection conditions transmitted by one or more nearby radio base stations 110, and determines a radio base station 110 to which the radio station 120 requests a connection, on the basis of the connection conditions. For example, among the one or more radio base stations 110 from which the connection conditions have been received, the radio station 120 determines a radio base station 110 that satisfies the communication quality required by the radio station 120 and has the lowest connection cost as a radio base station 110 to which the radio station 120 requests the connection.

However, with this method alone, traffic may be concentrated on a specific radio base station 110, as in the radio communication system 1 described with reference to FIGS. 10 and 11. For example, in FIG. 1, the radio station 120*a* is connected to the radio base station 110, and the radio stations 120*c* and 120*d* are connected to the radio base station 110*c*.

In this state, when the radio station 120*b* starts a new communication, in the related art, it is difficult to perform control so that the radio station 120*b* connects to the radio base station 110*a* with lower traffic in order to avoid concentration of the traffic on the radio base station 110*c*. For example, in the radio communication system 1 described with reference to FIGS. 10 and 11, the radio station 120*b* cannot be preferentially connected to the radio base station 110*a* with lower traffic.

Further, controlling an optimum connection destination for all the radio stations 120 with centralized control of the control station that totally controls the radio communication system 1 is not practical because the amount of processing is too large when the numbers of radio base stations 110 and the radio stations 120 increase.

Therefore, the radio base station 110 according to the present embodiment has a function of controlling (changing) the connection conditions used for connection to the radio station 120 by the radio base station 110 itself, on the basis of a use situation of other nearby radio base stations 110.

As an example, the radio base station 110*a* acquires information on radio stations 120 connected to the nearby radio base stations 110*b* and 110*c* from the blockchain shared by the plurality of radio base stations 110*a*, 110*b*, 110*c*, 110*d*, and 110*e*. Moreover, the radio base station 110*a* decreases the connection cost of the radio base station 110*a* when traffic is concentrated on the nearby radio base stations 110*b* and 110*c*.

For example, when the number of radio stations 120 connected to the nearby radio base station 110*b* or 110*c* is larger than the number of radio stations 120 connected to the radio base station 110*a*, the radio base station 110*a* may determine that traffic is concentrated on the nearby radio base station 110*b* or 110*c*. Alternatively, when the number of radio stations 120 connected to the nearby radio base station 110*b* or 110*c* is larger than a threshold value, the radio base station 110*a* may determine that the traffic is concentrated on the nearby radio base station 110*b* or 110*c*.

This makes it possible for the radio communication system 100 to perform control so that the radio station 120*b* newly starting communication preferentially selects, as a connection destination, the radio base station 110*a* with a lower connection cost than the radio base station 110*c*. It is possible to improve use efficiency of radio resources of the entire radio communication system 100 by each of the radio base stations 110 performing the same control.

As another example, the radio base station 110*c* acquires information on radio stations 120 connected to the nearby radio base stations 110*a*, 110*b*, and 110*e* from the blockchain shared by the plurality of radio base stations 110*a*, 110*b*, 110*c*, 110*d*, and 110*e*. Further, the radio base station 110*c* increases the connection cost of the radio base station 110*c* when the traffic is concentrated on the radio base station 110*c* itself.

For example, when the number of radio stations 120 connected to the radio base station 110*c* is larger than the number of radio stations 120 connected to the nearby radio base stations 110*a*, 110*b*, and 110*e*, the radio base station 110*c* may determine that the traffic is concentrated on the radio base station 110*c* itself. Alternatively, the radio base station 110*c* may determine that traffic is concentrated on the radio base station 110*c* itself when the number of radio stations 120 connected to the radio base station 110*c* is larger than a threshold value.

Thus, it is possible for the radio communication system 100 to perform control so that the radio station 120*b* newly starting communication preferentially selects, as connection destinations, the nearby radio base stations 110*a*, 110*b*, and 110*e* with a lower connection cost than the radio base station 110*c*. It is possible to improve use efficiency of radio resources of the entire radio communication system 100 by each of the radio base stations 110 performing the same control.

Functional Configuration

Next, functional configurations of a radio base station 110 and a radio station 120 according to the present embodiment will be described.

(Functional Configuration of Radio Base Station)

Figure 3:
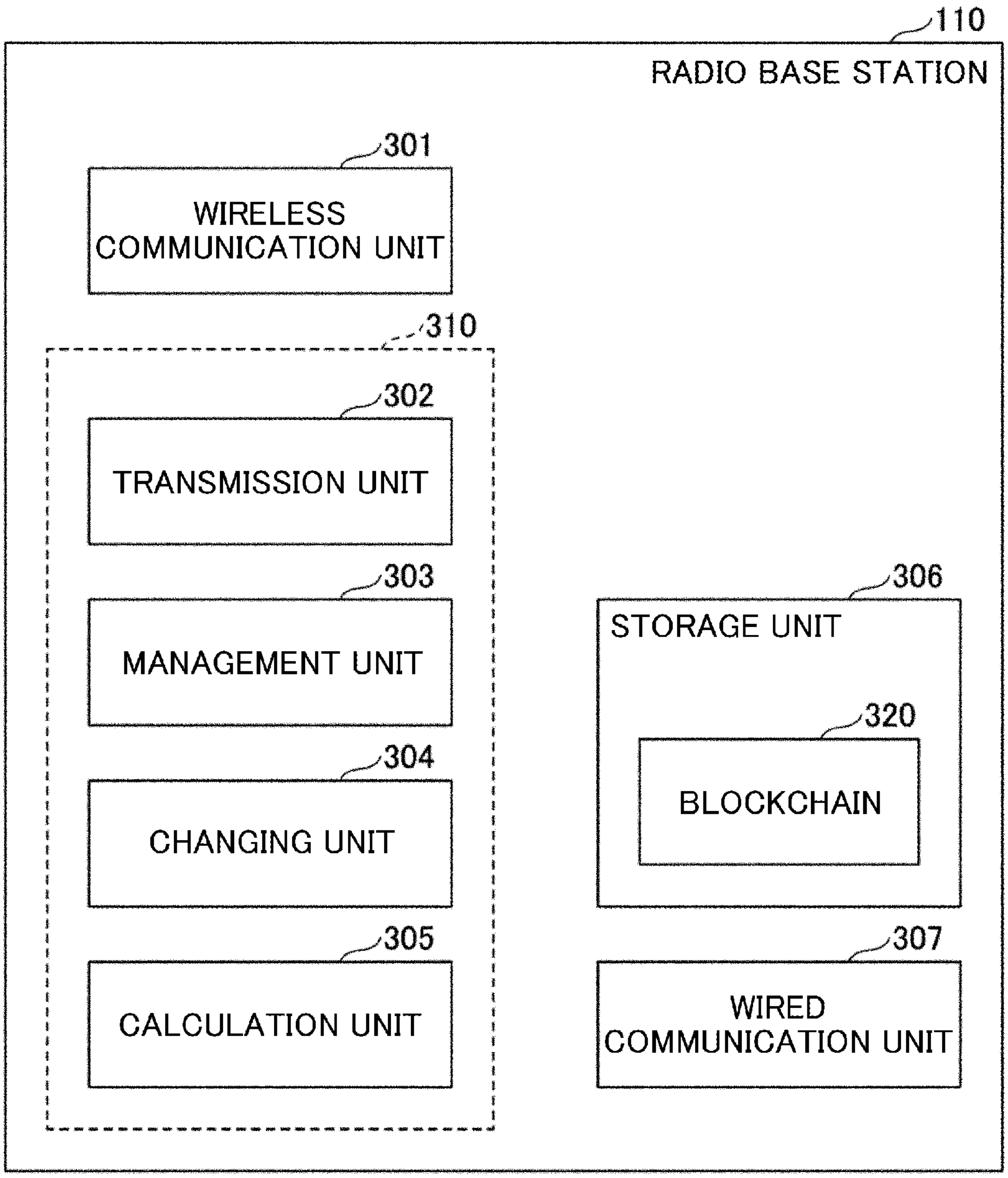
FIG. 3 is a diagram illustrating an example of a functional configuration of a radio base station according to the present embodiment.

FIG. 3 is a diagram illustrating an example of a functional configuration of a radio base station according to the present embodiment. The radio base station 110 has, for example, a computer configuration, and the computer executes a predetermined program to realize a wireless communication unit 301, a transmission unit 302, a management unit 303, a changing unit 304, a calculation unit 305, a storage unit 306, and a wired communication unit 307. At least some of the functional configurations described above may be realized by hardware.

The wireless communication unit 301 forms a network cell 111 capable of wireless communication with radio base stations 110 and performs wireless communication processing for performing wireless communication with radio stations 120 connected to the radio base station 110.

The transmission unit 302 performs transmission processing for broadcasting connection conditions for connecting to the radio base station 110 to the radio stations 120 within the network cell 111 of the radio base station 110. The connection conditions include, for example, information such as communication quality to be provided and a connection cost (connection fee) for connection to the radio base station 110.

The management unit 303 executes management processing for managing information on the radio stations 120 connecting to the radio base station 110 on the basis of the connection conditions transmitted by the transmission unit 302, by using the blockchain shared by the plurality of radio base stations 110. For example, the management unit 303 records the connection information with a radio station 120 requesting the connection to the radio base station 110 on the blockchain 320 shared with the other radio base stations 110 by executing a series of processes described in steps S1 to S6 in FIG. 10 with respect to the radio station 120.

Further, the management unit 303 executes various types of processing for managing the blockchain as a node of the blockchain shared by the plurality of radio base stations 110. The same processing is also executed in the other radio base stations 110, so that information on radio stations 120 connected to each radio base station 110 in the radio communication system 100 is recorded on the blockchain 320. Therefore, the radio base station 110 can acquire information of the radio stations 120 connected to the other radio base stations 110 by referring to the blockchain 320.

The changing unit 304 executes change processing for changing the connection conditions of the radio base station (its own station) 110 on the basis of the information of the radio stations 120 connected to the other radio base stations 110. For example, in FIG. 1, the changing unit 304 of the radio base station **110*a* lowers the connection cost of the radio base station 110*a* when traffic is concentrated on the other adjacent radio base stations 110*b* and 110*c*. Alternatively, the radio base station 110*c* may increase the connection cost of the radio base station 110*c* when traffic concentrates on the radio base station 110*c* rather than on the other adjacent radio base stations 110*a*, 110*b*, and 110*e***.

Here, the connection cost is a cost (for example, a connection fee) of connection of the radio station 120 to the radio base station 110, and the radio station 120, for example, preferentially connects to the radio base station 110 with the lowest connection cost among the radio base stations 110 satisfying required communication quality.

When a distance between the radio base station 110 and the radio station 120 is short, the transmission power can be reduced, and when a communication speed between the radio base station 110 and 120 is high, a communication time can be shortened. Therefore, the radio station 120 may determine the radio base station 110 to which the radio station 120 connects, in consideration of a received signal strength, a communication speed, or the like from the radio base station 110, in addition to the connection cost.

For example, the calculation unit 305 acquires the information on the radio stations 120 connected to the other radio base stations 110 from the blockchain 320 managed by the management unit 303, and calculates the number of the radio stations 120 connected to the other radio base stations 110. Alternatively, the calculation unit 305 calculates a transition probability that is a probability that the radio station 120 will transition to its own station among the plurality of radio base stations 110 that share the blockchain.

The transmission unit 302, the management unit 303, the changing unit 304, the calculation unit 305, and the like are included in a communication control unit 310 that controls wireless communication using the wireless communication unit 301, for example.

The storage unit 306 executes storage processing for storing various pieces of data, information, programs, and the like, which includes the blockchain 320, in a storage device or the like included in the radio base station 110, for example. The wired communication unit 307 connects the radio base station 110 to, for example, a wired communication network, and executes communication on the blockchain network 130 as illustrated in FIG. 2.

(Functional Configuration of Radio Station)

Figure 4:
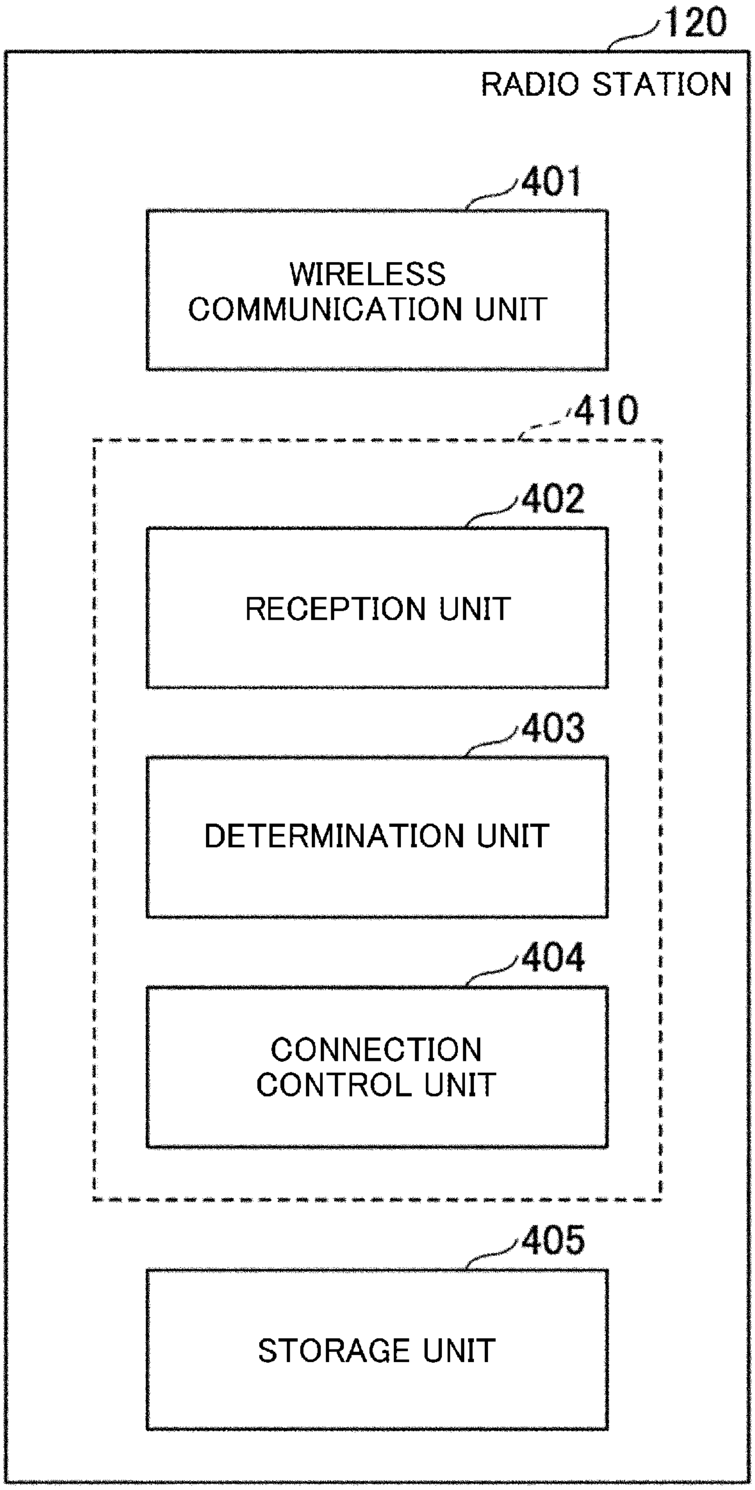
FIG. 4 is a diagram illustrating an example of a functional configuration of a radio station according to the present embodiment.

FIG. 4 is a diagram illustrating an example of a functional configuration of a radio station according to the present embodiment. The radio station 120, for example, has a computer configuration, and realizes a wireless communication unit 401, a reception unit 402, a determination unit 403, a connection control unit 404, a storage unit 405, and the like by the computer executing a predetermined program. At least some of the functional configurations described above may be realized by hardware.

The wireless communication unit 401 connects to a radio base station 110 through wireless communication and executes wireless communication processing for transmitting and receiving data. The reception unit 402 uses the wireless communication unit 401 to execute reception processing for receiving the connection conditions transmitted by the radio base station 110.

The determination unit 403 determines the radio base station 110 to which the radio station 120 requests connection, on the basis of the connection conditions received by the reception unit 402. For example, the radio station 120 preferentially connects to the radio base station 110 with the lowest connection cost among the radio base stations 110 that satisfy the required communication quality. When a distance between the radio station 120 and the radio base station 110 is short, the transmission power can be reduced, and when a communication speed between the radio base station 110 and the radio station 120 is high, a communication time can be shortened. Therefore, it is desirable for the radio station 120 to determine the radio base station 110 that is a connection destination on the basis of the communication quality of radio base station 110 and the connection cost.

The connection control unit 404 executes the connection processing for connection to the radio base station 110 that is a connection destination determined by the determination unit 403. For example, in the connection processing described in step S1 of FIG. 10, the connection control unit 404 transmits a connection request to the radio base station 110 that is a connection destination, and agrees on a wireless communication service to be provided.

The reception unit 402, the determination unit 403, the connection control unit 404, and the like are included in a communication control unit 410 that controls wireless communication using the wireless communication unit 401, for example.

The storage unit 405 executes, for example, storage processing for storing various pieces of data, information, programs, and the like necessary for wireless communication in a storage device or the like included in the radio station 120.

<Flow of Processing>

Subsequently, a flow of processing of the radio communication method according to the present embodiment will be described with a plurality of examples.

Example 1

(Processing of Wireless Base Station)

Figure 5:
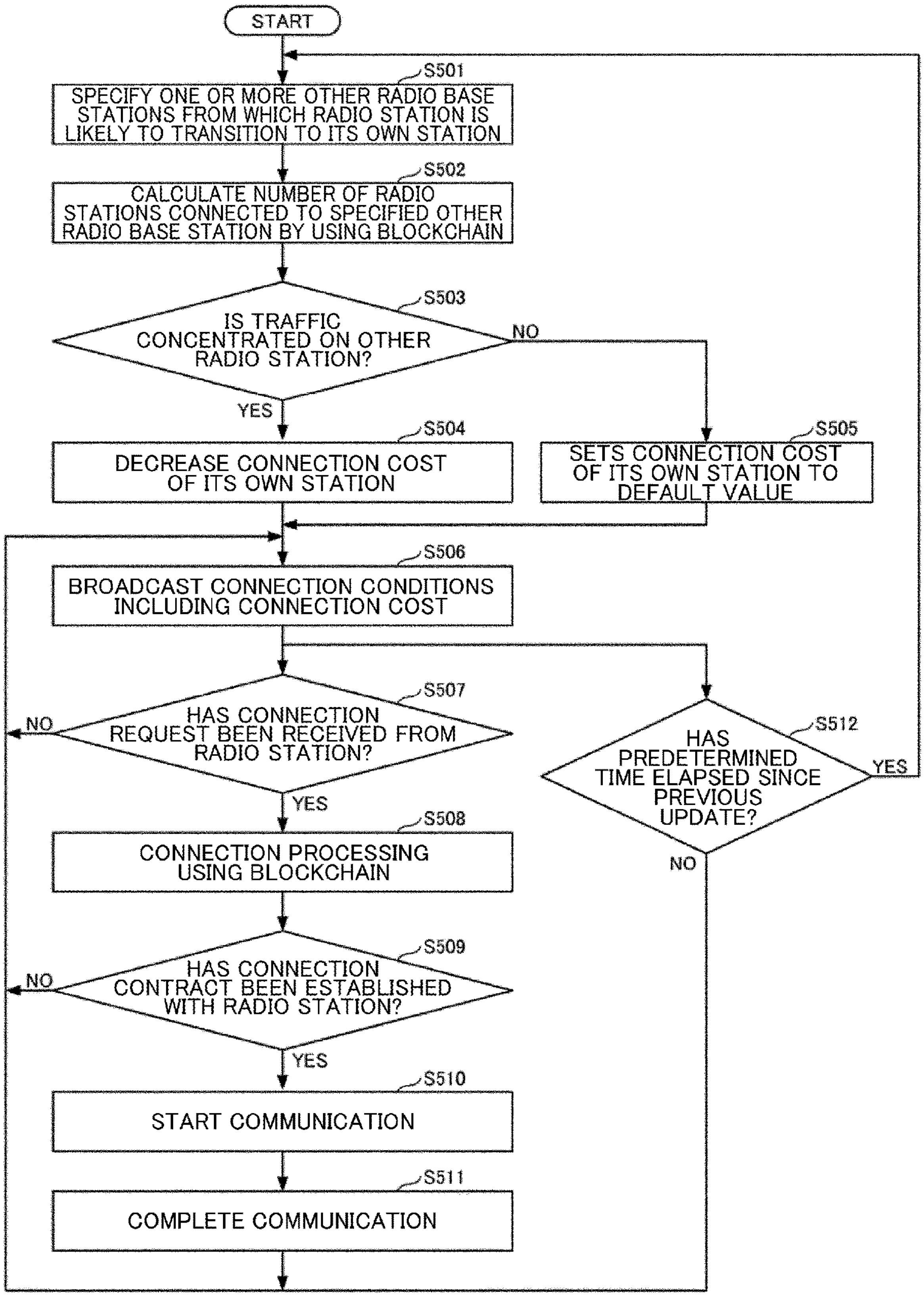
FIG. 5 is a flowchart illustrating an example of processing of a radio base station according to Example 1.

FIG. 5 is a flowchart illustrating a flow of processing of the radio base station according to Example 1. This processing shows an example of the processing executed by the radio base station 110 described with reference to FIG. 3.

In step S501, the changing unit 304 of the radio base station 110 specifies one or more other radio base stations

110 from which radio stations 120 are likely to transition to its own station (radio base station 110). For example, the changing unit 304 acquires transition information of the radio base stations 110 that are connection destinations of radio stations 120 from the blockchain 320, and specifies another radio base station 110 from which a radio station 120 has transitioned to its own station.

As a specific example, in FIG. 1, the changing unit 304 of the radio base station 110*a* determines the radio base station 110*b* to be the radio base station 110 from which a radio station 120 may transition to the radio base station 110*a* in a case where the radio station 120 was connected to the radio base station 110*b* and then connected to the radio base station 110*a*. By this processing, in the example of FIG. 1, the changing unit 304 of the radio base station 110*a* can specify the other radio base stations 110*b* and 110*c* adjacent to (or close to) the radio base station 110*a* among the plurality of radio base stations 110*a*, 110*b*, 110*c*, 110*d*, 110*e*, . . .

In step S502, the calculation unit 305 uses the blockchain 320 to calculate the number of radio stations 120 connected to the other radio base station 110 specified in step S501. In the example of FIG. 1, the calculation unit 305 of the radio base station 110*a* calculates the number of radio stations 120 connected to the radio base station 110*b* and the number of radio stations 120 connected to the radio base station 110*c*.

In step S503, the changing unit 304 determines whether or not the traffic is concentrated on the other radio base station 110 specified in step S501 on the basis of the calculation result of the calculation unit 305. For example, when the number of radio stations 120 connected to the other radio base station 110 specified in step S501 is larger than the number of radio stations 120 connected to its own station, the changing unit 304 may determine that the traffic is concentrated on the other radio base station 110. Alternatively, when an accommodation rate of radio stations 120 of the other radio base station 110 specified in step S501 is higher than an accommodation rate of radio stations 120 of its own station, the changing unit 304 may determine that the traffic is concentrated on the other radio base station 110.

As another example, when the number of radio stations 120 (or the accommodation rate of radio stations 120) connected to the other radio base station 110 specified in step S501 exceeds a threshold value, the changing unit 304 may determine that the traffic is concentrated on the other radio base station 110.

When the traffic is concentrated on the other radio base station 110, the changing unit 304 causes the processing to proceed to step S504. On the other hand, when the traffic is not concentrated on the other radio base station 110, the changing unit 304 causes the processing to proceed to step S505.

When the processing proceeds to step S504, the changing unit 304 decreases the connection cost of its own station (radio base station 110). As an example, the changing unit 304 may manage a normal connection cost (normal) and a connection cost (low) that is lower than the normal connection cost, and set the connection cost to the connection cost (low). As another example, the changing unit 304 may manage a plurality of stages of connection cost lower than the connection cost (normal) and lower the connection cost by one stage. In this case, a minimum connection cost may be set in advance.

On the other hand, when the processing proceeds to step S505, the changing unit 304 sets the connection cost of its own station to a default value. For example, when the current connection cost is not the connection cost (normal), the changing unit 304 sets the connection cost to the connection cost (normal). On the other hand, when the current connection cost is the connection cost (normal), the current connection cost is maintained.

In step S506, the transmission unit 302 uses the wireless communication unit 301 to broadcast the connection conditions. For example, the transmission unit 302 periodically transmits, through wireless communication, a notification message including the connection conditions including information such as the communication quality of wireless communication provided by its own station (radio base station 110) and the connection cost.

In step S507, the management unit 303 determines whether or not the wireless communication unit 301 has received a connection request from a radio station 120, and executes the processing of step S508 and subsequent steps when the connection request has been received.

When the processing proceeds to step S508, the management unit 303 uses the blockchain 320 to execute the connection processing described in steps S1 to S6 of FIG. 10, for example.

In step S509, the management unit 303 determines whether or not the connection contract with the radio station 120 has been established, and the management unit 303 causes the processing to proceed to step S510 when the connection contract has been established. On the other hand, when the connection contract has not been established, the management unit 303 returns the processing to step S506.

When the processing proceeds to step S510, the radio base station 110 starts communication with the radio station 120 that has transmitted the connection request, and returns the processing to step S506 when the communication is completed in step S511.

The changing unit 304, for example, executes the processing of step S512 in parallel with the processing of steps S507 to S511.

In step S512, the changing unit 304 determines whether or not a predetermined time has passed since previous execution of the processing of steps S501 to S505. Here, the predetermined time is a preset connection cost update interval. When the predetermined time has elapsed, the changing unit 304 executes the processing of steps S501 to S505 again. When the predetermined time has not elapsed, the changing unit 304 returns the processing to step S506 and waits until the predetermined time has elapsed.

Through the above processing, the radio base station 110 reduces the connection cost of its own station when the traffic is concentrated on the other nearby radio base stations 110. For example, in FIG. 1, the radio base station 110*a* determines that the traffic is concentrated on the other nearby radio base stations 110*c*, and decreases the connection cost of the radio base station 110*a*. This makes it possible to perform control so that the radio station 120*b*, which is about to start communication, is connected to the radio base station 110*a* with a lower connection cost.

Further, each of the plurality of radio base stations 110 included in the radio communication system 100 executes the processing of FIG. 5, thereby making it possible to improve the use efficiency of radio resources of the entire radio communication system 100.

(Processing of Radio Station)

Figure 6:
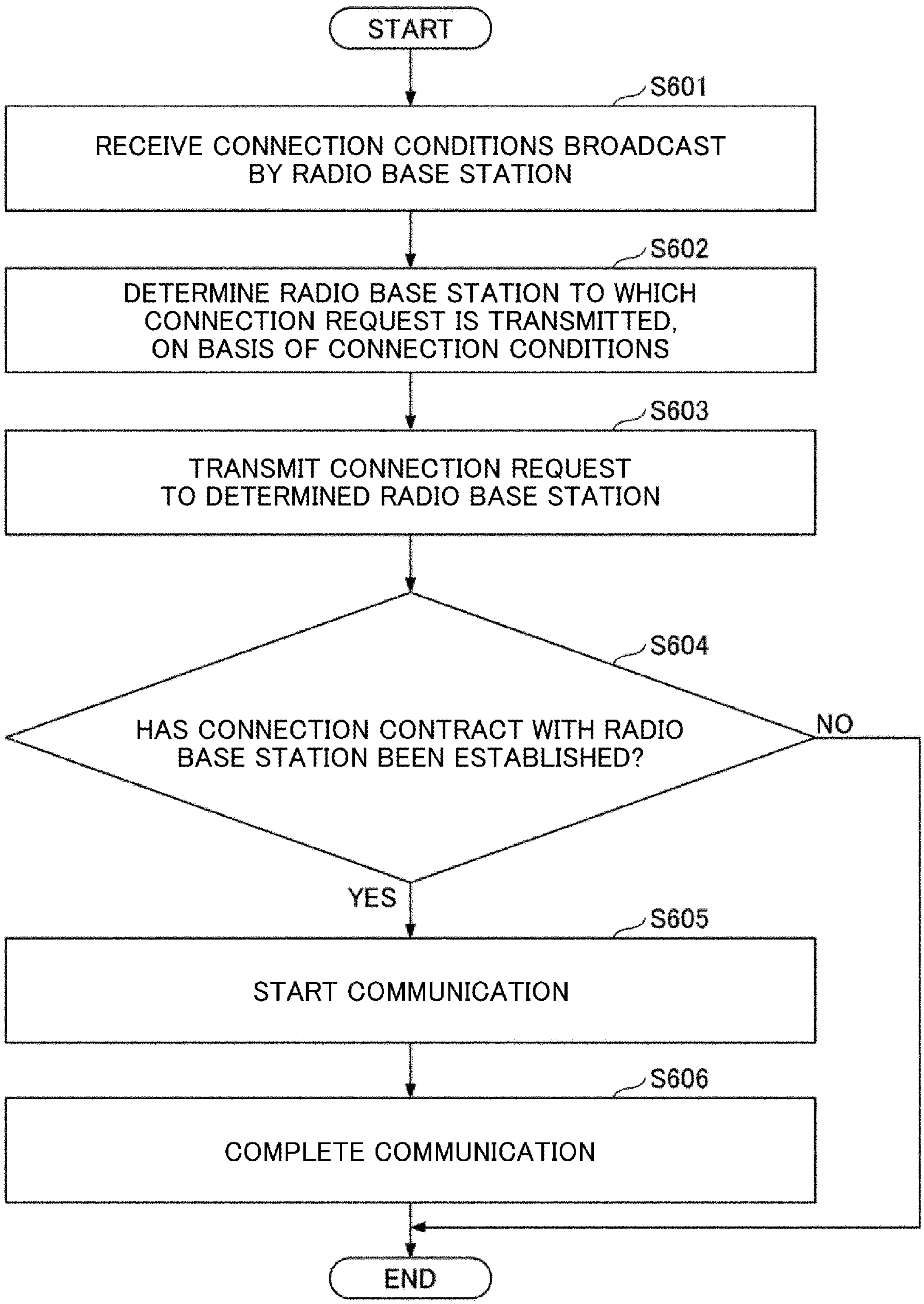
FIG. 6 is a flowchart illustrating an example of processing of a radio station according to Example 1.

FIG. 6 is a flowchart illustrating a flow of processing of the radio station according to Example 1. This processing shows an example of processing executed when the wireless communication is started by the radio station 120 described in FIG. 4.

In step S601, the reception unit 402 receives the connection conditions broadcasted by a radio base station 110. This connection conditions include information such as communication quality of the wireless communication provided by the radio base station 110 and the connection cost, as described above.

In step S602, the determination unit 403 determines the radio base station 110 to which the radio station 120 requests connection, on the basis of the connection conditions received by the reception unit 402. For example, the determination unit 403 may determine the radio base station 110 with the lowest connection cost among radio base stations 110 satisfying the required communication quality to be the radio base station 110 to which the connection is requested. Further, when there are a plurality of radio base stations 110 with the same connection cost, the determination unit 403 may determine the radio base station 110 with the highest communication quality to be the radio base station 110 to which the connection is requested.

In step S603, the connection control unit 404 transmits a radio communication connection request to the radio base station 110 determined by the determination unit 403. The radio base station 110 that has received this connection request executes the processing of step S508 in FIG. 5, for example.

In step S604, the connection control unit 404 determines whether or not a connection contract with the radio base station 110 has been established, and the processing proceeds to step S605 when the connection contract has been established. On the other hand, when the connection contract has not been established, the radio station 120 ends the processing of FIG. 6.

When the processing proceeds to step S605, the radio station 120 starts communication with the radio base station 110 that is a connection destination, and ends the processing of FIG. 6 when the communication is completed in step S606. The above processing can allow the radio station 120 to preferentially connect to the radio base station 110 with the lowest connection cost among the nearby radio base stations 110.

When communication quality deteriorates during communication, radio station 120 may execute the processing in FIG. 6 again and switch the connection destination to a new radio base station 110. Further, when the connection cost of the radio base station 110 increases during communication, the radio station 120 may perform the processing in FIG. 6 again and switch the connection destination to a new radio base station 110.

As described above, according to Example 1, the processing of FIGS. 5 and 6 makes it possible to improve the use efficiency of radio resources of the entire radio communication system 100 in the radio communication system 100 in which the radio station 120 autonomously determines the radio base station 110 that is a connection destination.

Example 2

(Processing of Radio Base Station)

Figure 7:
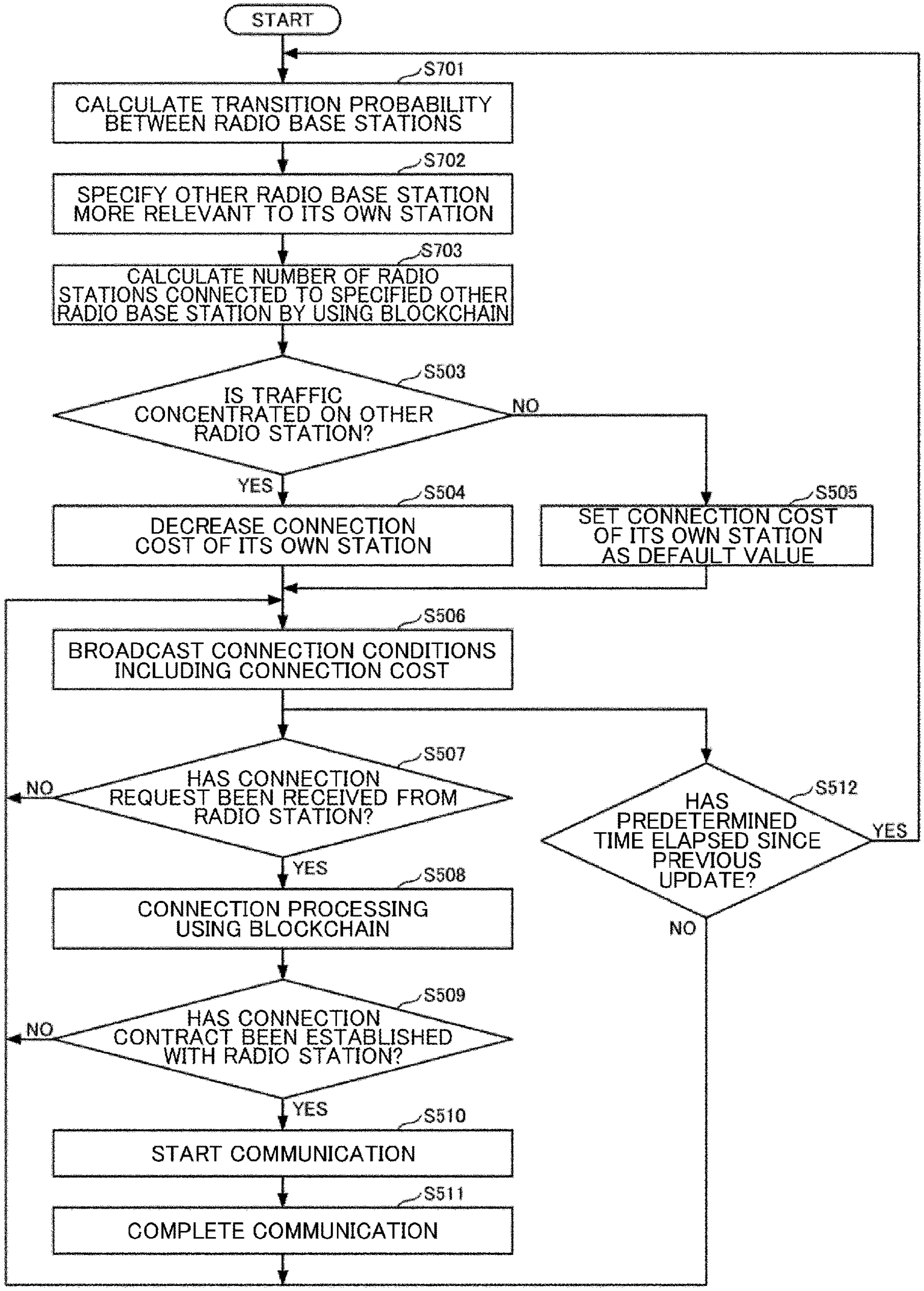
FIG. 7 is a flowchart illustrating an example of processing of a radio base station according to Example 2.

FIG. 7 illustrates an example of processing of a radio base station according to Example 2. This processing represents another example of the processing executed by the radio base station 110 described with reference to FIG. 5. Among the processing illustrated in FIG. 7, the processing of steps S503 to S512 are the same as the processing of the radio base station according to Example 1 described with reference to FIG. 5, and thus, description thereof will be omitted herein.

In step S701, the calculation unit 305 of the radio base station 110 refers to the blockchain 320 to calculate a transition probability between radio base stations 110. For example, the calculation unit 305 calculates a transition probability $P_{i,j}$ between radio base stations 110 by using Equation (1) below.

[Math. 1]

$$Pi, j = \frac{T_{i,j}}{T_{i,total}} \tag{1}$$

Here, $T_{i,j}$ indicates the number of times the radio station 120 transitions from a radio base station 110$_i$ to a radio base station 110$_j$ (i and j are integers equal to or greater than 1). $T_{i,total}$ indicates a total number of transitions of the radio station 120 from the radio base station 110$_i$ to the other radio base station 110. The calculation unit 305 acquires, from the blockchain 320, the number of times the radio station 120 transitions between the radio base stations 110.

In step S702, the changing unit 304 specifies the other radio base station 110 that is more relevant to its own station on the basis of the transition probability $P_{i,j}$ calculated by the calculation unit 305. For example, the changing unit 304 determines another radio base station 110 having the transition probability $P_{i,j}$ with its own station exceeding a threshold value to be the other radio base station 110 that is more relevant to its own station. Thus, for example, in FIG. 1, the radio base station 110*a* can specify the radio base stations 110*b* and 110*c* adjacent to the radio base station 110*a* as the other radio base stations 110 that are more relevant to its own station.

In step S703, the calculation unit 305 uses the blockchain 320 to calculate the number of radio stations 120 connected to the other radio base station 110 specified in step S702.

As described above, the radio base station 110 may calculate the number of radio stations connected to the other nearby radio base station 110 by executing the processing of steps S701 to S703 of FIG. 7 instead of the processing of steps S501 and S502 of FIG. 5. The processing of the radio station 120 according to Example 2 may be the same as the processing of the radio station 120 according to Example 1.

Example 3

(Processing of Radio Base Station)

Figure 8:
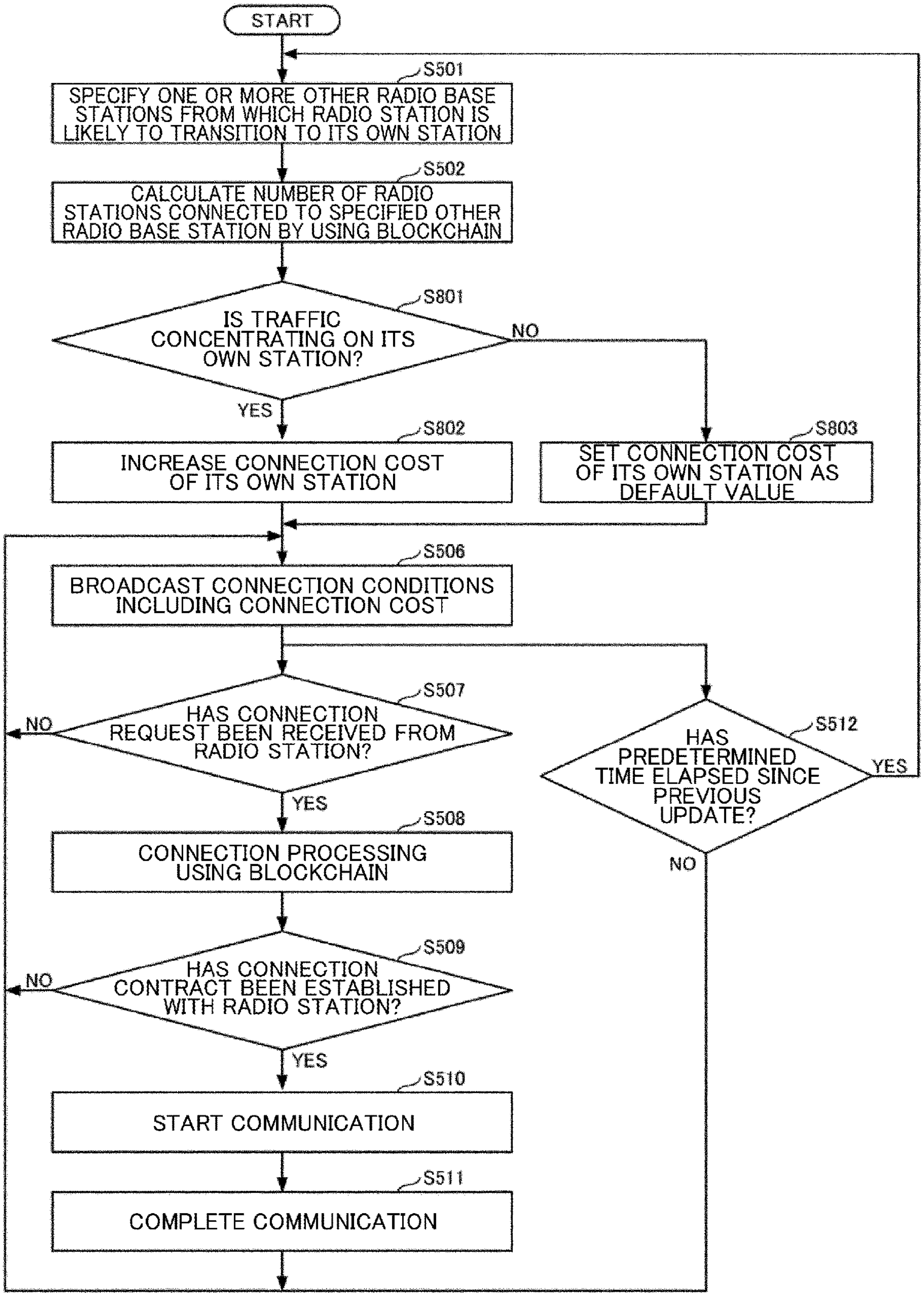
FIG. 8 is a flowchart illustrating an example of processing of a radio base station according to Example 3.

FIG. 8 illustrates an example of processing of a radio base station according to Example 3. This processing represents another example of the processing executed by the radio base station 110 described with reference to FIG. 5. Since the processing of steps S501, S502, and S506 to S512 among the processing illustrated in FIG. 8 are the same as the processing of the radio base station according to Example 1 described with reference to FIG. 5, descriptions thereof will be omitted herein.

In step S801, the changing unit 304 determines whether or not traffic is concentrated on its own station on the basis of the calculation result of the calculation unit 305. For example, when the number of radio stations 120 connected to the other radio base station 110 specified in step S501 is smaller than the number of radio stations 120 connected to its own station, the changing unit 304 may determine that the traffic is concentrated on its own station. Similarly, when the number of radio stations 120 connected to its own station is larger than the number of radio stations 120 connected to the other radio base station 110 specified in step S501, the changing unit 304 may determine that the traffic is concentrated on its own station.

Alternatively, when the accommodation rate of radio stations 120 of the other radio base station 110 specified in step S501 is lower than an accommodation rate of radio stations 120 of its own station, the changing unit 304 may determines that the traffic is concentrating on its own station. Similarly, when the accommodation rate of the radio stations 120 of its own station is higher than the accommodation rate of the radio stations 120 of the other radio base station 110 specified in step S501, the changing unit 304 may determine that the traffic is concentrated on its own station.

When the traffic is concentrated on its own station, the changing unit 304 causes the processing to proceed to step S802. On the other hand, when the traffic is not concentrated on its own station, the changing unit 304 causes the processing to proceed to step S803.

When the processing proceeds to step S802, the changing unit 304 increases the connection cost of its own station (radio base station 110). As an example, the changing unit 304 may manage the normal connection cost (normal) and a connection cost (high) higher than the normal connection cost, and set the connection cost to the connection cost (high). As another example, the changing unit 304 may manage a plurality of stages of connection cost higher than the connection cost (normal), and increase the connection cost by one stage. In this case, a maximum connection cost may be set in advance.

On the other hand, when the processing proceeds to step S803, the changing unit 304 sets the connection cost of its own station to a default value. For example, when the current connection cost is not the connection cost (normal), the changing unit 304 sets the connection cost to the connection cost (normal). On the other hand, when the current connection cost is the connection cost (normal), the current connection cost is maintained.

By the processing, the radio base station 110 increases the connection cost of its own station when the traffic is concentrated on its own station. For example, in FIG. 1, the radio base station 110*c* determines that traffic is concentrated on its own station, and increases the connection cost of the radio base station 110*c*. This makes it possible to perform control so that the radio station 120*b*, which is about to start communication, is connected to the radio base station 110*a* with a lower connection cost.

Further, each of the plurality of radio base stations 110 included in the radio communication system 100 executes the processing of FIG. 8, thereby making it possible to improve the use efficiency of radio resources of the entire radio communication system 100.

The radio base station 110 may execute the processing of steps S701 to S703 of FIG. 7 instead of the processing of steps S501 and S502 of FIG. 8.

<Hardware Configuration Example>

Figure 9:
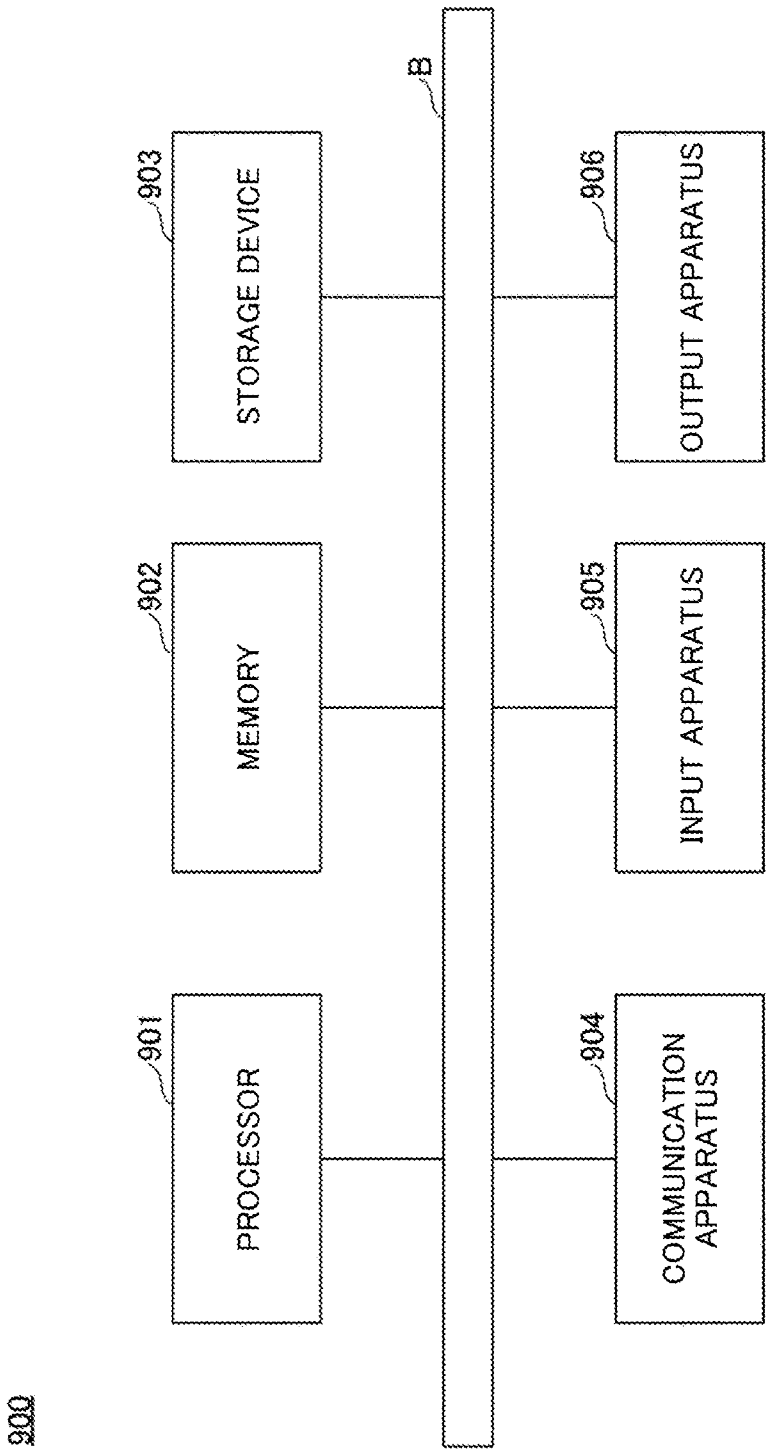
FIG. 9 is a diagram illustrating an example of a hardware configuration of each of a radio base station and a radio station according to the present embodiment.

FIG. 9 is a diagram illustrating an example of hardware configurations of a radio base station and a radio station according to the present embodiment. The radio base station 110 and the radio station 120 have, for example, a configuration of a computer 900 as illustrated in FIG. 9. In the example of FIG. 9, the computer 900 includes a processor 901, a memory 902, a storage device 903, a communication apparatus 904, an input apparatus 905, an output apparatus 906, a bus B, and the like.

The processor 901 is, for example, an arithmetic device such as a central processing unit (CPU) that realizes various functions by executing a predetermined program. The memory 902 is a storage medium that is readable by the computer 900, and includes, for example, a random access memory (RAM), and a read only memory (ROM). The storage device 903 is a computer-readable storage medium, and may include, for example, a hard disk drive (HDD), a solid state drive (SSD), any optical disc, a magneto-optical disc, and the like.

The communication apparatus 904 includes one or more pieces of hardware (communication device) for performing communication with another device over a wireless or wired network. For example, the communication apparatus 904 of the computer 900 included in the radio base station 110 includes a communication device for performing wireless communication and a communication device for performing wired communication. Further, the computer 900 included in the radio station 120 includes a communication device for wireless communication.

The input apparatus 905 is an input apparatus (for example, a keyboard, mouse, microphone, switch, button, or sensor) that receives an input from the outside. The output apparatus 906 is an output apparatus (for example, a display, a speaker, or an LED lamp) that performs output to the outside. The input apparatus 905 and the output apparatus 906 may be integrated (for example, an input and output apparatus such as a touch panel display).

The bus B is commonly connected to each component described above, and transmits, for example, an address signal, a data signal, and various control signals. The processor 901 is not limited to the CPU, and may be, for example, a digital signal processor (DSP), a programmable logic device (PLD), or a field programmable gate array (FPGA).

(Supplements)

The radio base station 110 and the radio station 120 in the present embodiment are not limited to realization using a dedicated device, and may be realized by a general-purpose computer. In this case, a program for realizing this function may be recorded in a computer-readable recording medium, and the program recorded in this recording medium may be read into a computer system and executed. The "computer system" referred to here includes hardware such as an OS and peripheral devices.

Further, the "computer-readable recording medium" includes a portable medium such as a flexible disk, magneto-optical disk, a ROM and a CD-ROM, and various storage devices such as a hard disk built into a computer system. Further, the "computer-readable recording medium" may also include a recording medium that dynamically holds a program for a short period of time, such as a communication line when the program is transmitted over a network such as the Internet or a communication line such as a telephone line or a recording medium that holds a program for a certain period of time, such as a volatile memory inside a computer system serving as a server or a client in such a case.

Further, the program may be a program for realizing some of the above-described functions, may be a program capable of realizing the above-described functions in a combination with a program already recorded on the computer system, or may be a program realized using hardware such as a programmable logic device (PLD) or a field programmable gate array (FPGA).

<Effects of Embodiment>

According to the radio communication system 100 according to the present embodiment, it is possible to improve the use efficiency of radio resources of the entire radio communication system 100 in the radio communication system 100 in which the radio station 120 determines the radio base station 110 that is a connection destination. For example, it is possible to suppress a decrease in the number of radio stations 120 that can be accommodated in the entire radio communication system 100.

For example, when the traffic is concentrated on the other nearby radio base station 110, the radio base station 110 of the radio communication system 100 performs control to decrease the connection cost of its own station so that the nearby radio stations 120 can be connected to its own station more easily.

Alternatively, when the traffic is concentrated on the radio base station 110 of the radio communication system 100, the radio base station 110 of the radio communication system 100 performs control to increase the connection cost of the radio station so that the nearby radio stations 120 can be easily connected to the other nearby radio base station 110.

Further, the radio base station 110 of the radio communication system 100 can specify the other radio base station 110 around its own station by using the blockchain 320 shared with the other radio base station 110, and to easily ascertain the number of radio stations 120 connected to the other radio base station 110.

<Conclusion of Embodiment>

The present specification discloses at least a radio communication method and a radio communication system of the following items.

(Item 1)

A radio communication method including:

a transmitting step of broadcasting, by a radio base station, a connection condition of the radio base station;

a managing step of managing, by the radio base station, a connection with a radio station requesting a connection to the radio base station based on the connection condition, by using a blockchain shared by a plurality of radio base stations; and a changing step of acquiring, by the radio base station, information on a radio station connected to another radio base station from the blockchain and changing the connection condition of the radio base station based on the information on the radio station connected to the other radio base station.

(Item 2)

The radio communication method according to item 1, wherein the changing step includes decreasing a connection cost of the radio base station when traffic is concentrated on the other radio base station.

(Item 3)

The radio communication method according to item 1 or 2, wherein the changing step includes increasing a connection cost of the radio base station when traffic is concentrated on the radio base station.

(Item 4)

The radio communication method according to any one of items 1 to 3, wherein the other radio base station includes one or more radio base stations having a higher transition probability of the radio station transitioning to the radio base station among the plurality of radio base stations that share the blockchain.

(Item 5)

The radio communication method according to any one of items 1 to 3, wherein the other radio base station includes one or more radio base stations adjacent to or close to the radio base station among the plurality of radio base stations that share the blockchain.

(Item 6)

A radio base station including:

a transmission unit configured to broadcast a connection condition of the radio base station;

a management unit configured to manage a connection with a radio station requesting a connection to the radio base station based on the connection condition, by using a blockchain shared by a plurality of radio base stations; and a changing unit configured to acquire information on a radio station connected to another radio base station from the blockchain and change the connection condition of the radio base station based on the information on the radio station connected to the other radio base station.

(Item 7)

A radio communication system including a plurality of radio base stations and a radio station, wherein the radio base station includes a transmission unit configured to broadcast a connection condition of the radio base station;

a management unit configured to manage a connection with a radio station requesting a connection to the radio base station based on the connection conditions, by using a blockchain shared by the plurality of radio base stations; and a changing unit configured to acquire information on a radio station connected to another radio base station from the blockchain and changes the connection condition of the radio base station based on the information on the radio station connected to the other radio base station, and wherein the radio station includes a reception unit configured to receive the connection condition; and a determination unit configured to determine the radio base station to which the radio station requests the connection, based on the connection condition.

Although the embodiment has been described above, the present invention is not limited to such a specific embodiment, and various modifications and changes are possible within the scope of the gist of the present invention described in the claims.

| Reference Signs List | |
|---|---|
| 100 | Radio communication system |
| 110, and 110a to 110e | Radio base station |
| 120, and 120a to 120d | Radio station |
| 302 | Transmission unit |
| 303 | Management unit |
| 304 | Changing unit |
| 305 | Calculation unit |
| 306 | Storage unit |
| 320 | Blockchain |

The invention claimed is:

1. A radio communication method comprising:

broadcasting, by a first radio base station, a connection condition of the first radio base station;

managing, by the first radio base station, a connection with a first radio station requesting a connection to the first radio base station based on the connection condition, by using a blockchain shared by the first radio base station and second radio base stations;

determining, by the first radio base station, whether or not a second radio station, which is connected to one of the second radio base stations, has a probability of transitioning to connect to the first radio base station;

in response to a determination that the second radio station has the probability of transitioning to connect to the first radio base station, acquiring, by the first radio base station, information on the second radio station connected to the one of the second radio base stations from the blockchain; and changing the connection condition of the first radio base station based on the information on the second radio station connected to the one of the second radio base stations, wherein the second radio base stations include one or more radio base stations having a transition probability of a radio station transitioning to the first radio base station greater than a threshold value.

2. The radio communication method according to claim 1, wherein the changing of the connection condition includes decreasing a connection cost of the first radio base station when traffic is concentrated on the one of the second radio base stations.

3. The radio communication method according to claim 1, wherein the changing of the connection condition includes increasing a connection cost of the first radio base station when traffic is concentrated on the first radio base station.

4. The radio communication method according to claim 1, wherein the second radio base stations include one or more radio base stations adjacent to or close to the first radio base station.

5. The radio communication method according to claim 1, wherein in the determining, in a case where the second radio station connected to the one of the second radio base station transitions to the first radio base station, the second radio station is determined to have the probability of transitioning to connect to the first radio base station.

6. A radio base station comprising:

a processor; and a memory storing program instructions that cause the processor to:

broadcast a connection condition of the radio base station;

manage a connection with a first radio station requesting a connection to the radio base station based on the connection condition, by using a blockchain shared by the radio base station and other radio base stations;

determine whether or not a second radio station, which is connected to one of the other radio base stations, has a probability of transitioning to connect to the radio base station;

in response to a determination that the second radio station has the probability of transitioning to connect to the first radio base station, acquire information on the second radio station connected to the one of the other radio base stations from the blockchain; and change the connection condition of the radio base station based on the information on the second radio station connected to the one of the other radio base stations, wherein the other radio base stations includes one or more radio base stations having a transition probability of a radio station transitioning to the first radio base station greater than a threshold value.

7. A radio communication system comprising:

a plurality of radio base stations including a first radio base station and second radio base stations; and a first radio station, wherein the first radio base station includes a processor of the first radio base station; and a memory of the first radio base station storing program instructions that cause the processor of the first radio station to:

broadcast a connection condition of the first radio base station;

manage a connection with a first radio station requesting a connection to the first radio base station based on the connection condition, by using a blockchain shared by the first radio base station and the second radio base stations;

determine whether or not a second radio station connected to one of the second radio base stations has a probability of transitioning to connect to the first radio base station;

in response to a determination that the second radio station has the probability of transitioning to connect to the first base station, acquire information on the second radio station connected to the one of the second radio base stations from the blockchain; and change the connection condition of the first radio base station based on the information on the second radio station connected to the one of the second radio base stations, and wherein the first radio station includes a processor of the first radio station; and a memory of the first radio station storing program instructions that cause the processor of the first radio station to:

receive the connection condition; and determine the first radio base station to which the first radio station requests the connection, based on the connection condition, wherein the second radio base stations include one or more radio base stations having a transition probability of a radio station transitioning to the first radio base station greater than a threshold value.

* * * * *